Dec. 29, 1970  JAMES E. WEBB  3,551,266
ADMINISTRATOR OF THE NATIONAL AERONAUTICS
AND SPACE ADMINISTRATION
CERAMIC INSULATION FOR RADIANT HEATING ENVIRONMENTS
AND METHOD OF PREPARING THE SAME
Filed March 1, 1968  3 Sheets-Sheet 1

VAUGHN F. SEITZINGER
ROBERT W. ALLEN
INVENTOR.(S)

Dec. 29, 1970  JAMES E. WEBB  3,551,266
ADMINISTRATOR OF THE NATIONAL AERONAUTICS
AND SPACE ADMINISTRATION
CERAMIC INSULATION FOR RADIANT HEATING ENVIRONMENTS
AND METHOD OF PREPARING THE SAME
Filed March 1, 1968  3 Sheets-Sheet 3

VAUGHN F. SEITZINGER
ROBERT W. ALLEN
INVENTOR.(S)

BY

Joseph H. Beumer
ATTORNEYS

United States Patent Office 3,551,266
Patented Dec. 29, 1970

3,551,266
CERAMIC INSULATION FOR RADIANT HEATING ENVIRONMENTS AND METHOD OF PREPARING THE SAME
James E. Webb, Administrator of the National Aeronautics and Space Administration, with respect to an invention of Vaughn F. Seitzinger, Fayetteville, Tenn., and Robert W. Allen, Titusville, Fla.
Filed Mar. 1, 1968, Ser. No. 709,622
Int. Cl. B32b *19/08, 3/10*
U.S. Cl. 161—69                              11 Claims

ABSTRACT OF THE DISCLOSURE

An unfired ceramic insulation containing finely divided potassium titanate, asbestos and alumina-silica refractory fibers in a gelled silica sol binder. The insulation is prepared by acidifying a silica sol, mixing the sol with the remaining components, applying the mixture to a substrate and curing. Migration of the binder during curing is prevented by acidification of the silica sol.

---

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

This invention relates to insulation materials and more particularly to an unfired ceramic insulation for protection from radiant heating environments.

One of the problems encountered in the development of Saturn-class rocket launch vehicles for lunar exploration missions is the provision of suitable insulating material for protection of the base region of the vehicle. It is readily apparent that tremendous amounts of heat are generated by the multiple engines in such vehicles and that highly effective thermal protection is required to protect exposed structural members from damage or destruction during launching. The most critical requirement is for protection from radiant heat since about 60 to 80 percent of the total heat in the launch environment is radiant heat from engine exhaust plumes, the remaining 20 to 40 percent being convective heat from recirculating gases. In addition to providing effective thermal protection, as exemplified by a requirement for a maximum temperature of 500° F. for structures exposed to an intense radiant heat flux of 40 B.t.u./ft.$^2$/sec., the insulation for such applications must be capable of being applied without a high-temperature firing step, and it must exhibit favorable mechanical strength and substrate adhesion.

A promising insulation material for launch vehicle applications was developed previously by Seitzinger, this insulation and its method of preparation being described in U.S. Pat. No. 3,296,060 issued Jan. 3, 1967. The previous material comprised a colloidial silica binder, potassium titanate, high-silica glass fibers and asbestos fibers, an optimized composition being, in parts by weight; potassium titanate containing 10 percent high-silica glass fibers, 90; asbestos, 10; and a silica sol containing 30 weight percent silica solids, 420. This composition was prepared by mixing the dry solids, combining them with the sol to produce a trowellable mixture, applying the mixture to a substrate and curing by mild heating to obtain a hard, highly reflective surface. Although this insulation has shown adequate insulating properties, it has also exhibited disadvantages which limit its usefulness. The colloidial silicia binder migrates during drying to produce a hard, dense outer surface and a soft, less-dense, relatively weak interior. This result provides some advantages in that the outer layer is sufficiently hard to resist erosion and physical abuse and the lightweight interior is a good insulator. However, adhesion of the soft interior portion to the heat shield substrate is weak so that the insulation could fall off or become separated from the substrate when subjected to the severe vibration and mechanical stresses encountered during launching. In addition, the previous insulation contained a relatively high proportion of potassium titanate, and it was subject to cracking and to variations in mechanical properties resulting from slight differences in different lots of this component. Improvements in insulating efficiency and refractoriness, consistent with better substrate adhesion and improved reproducibility, are also desired.

SUMMARY OF THE INVENTION

In the present invention an improved insulation composition containing a silica sol binder, potassium titanate, asbestos and refractory fibers is obtained by acidification of the silica sol and by provding a higher proportion of refractory fibers and a correspondingly lower proportion of potassium titanate in the composition. This composition has a uniform density upon being cured, migration of the silica sol binder being prevented by the gelation which results from acidification, and substrate adhesion is substantially improved. Insulating effectiveness is increased and a higher degree of refractoriness is shown. These improvements are realized without loss of other required features, including a relatively low density and the capability for convenient application and low-temperature curing.

It is therefore an object of this invention to provide an insulation material for protection from radiant heating environments.

Another object is to provide an unfired ceramic insulation which shows strong adhesion to substrates.

Another object is to provide a silica-sol containing insulation composition which cures without migration of the silica sol to the surface.

Another object is to provide a highly refractory insulation composition having increased reflectance.

Another object is to provide a method of preventing silica sol migration during curing of refractory insulation compositions containing the same.

Another object is to provide a method of preparing an unfired ceramic insulation for application to substrates.

Other objects and advantages of the invention will be apparent from the following detailed description and the drawings.

DESCRIPTION OF THE PREFERRED EMBODIMENT

Figure 1:
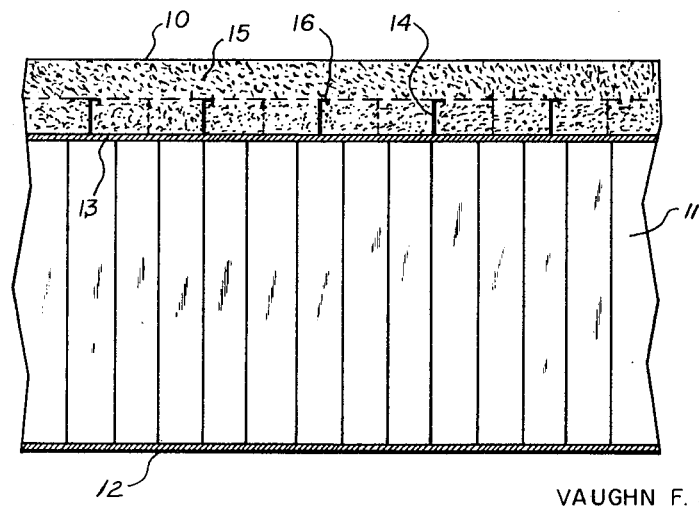
FIG. 1 is a sectional view showing a portion of a heat shield coated with insulation prepared in accordance with the present invention.

Referring to FIG. 1 in the drawings, a portion of a heat shield 10 for rocket vehicle application is shown in sectional side view. The metal supporting structure includes a honeycomb core 11 joined to a bottom face sheet 12 and a top face sheet 13. The top face sheet 13 has an open-faced, diamond-shaped honeycomb structure 14 joined thereto. Insulation composition 15 prepared in accordance with the present invention is applied as a layer which fills the crevices in the honeycomb structure 14. The outer edge 16 of the honeycomb structure is bent downward by partial crushing to provide interlocking support to the insulation 15.

The insulation composition of the present invention contains an acidified aqueous silica sol binder at a proportion sufficient to provide the desired consistency for application. In general about 330 to 450 parts by weight per 100 parts of the remaining components can be used, with the larger amounts being used for mixtures containing higher proportions of potassium titanate. Although not critical, it is preferred to use a silica sol containing about 30 weight percent silica. More concentrated sols result in a higher bulk density without providing any advantages. An example of a suitable silica sol is "Ludox HS" (trade name of E. I. du Pont de Nemours, Incorporated) having the following properties: silica content, 30 weight percent; pH at 25° C., 9.8; particle diameter, 12 millimicrons; surface area, 220 to 235 square meters per gram; specific gravity, 1.211; viscosity, 5 centipoises at 25° C.; and sodium oxide content 0.32 weight percent.

Figure 2:
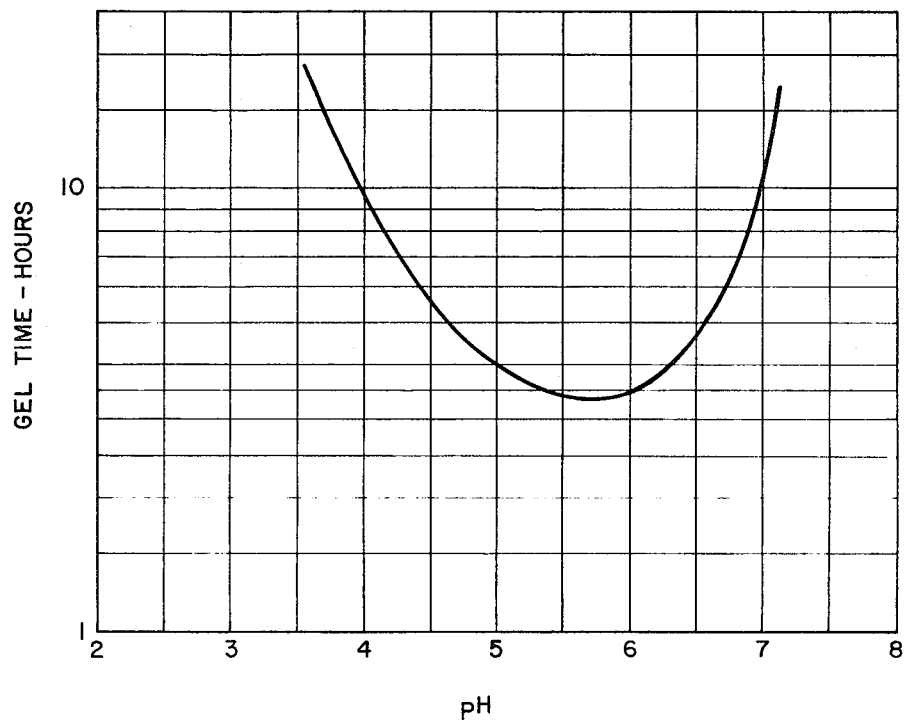
FIG. 2 is a graph showing the effect of pH on the time required for silica sol gelation.

The silica sol is acidified to promote gelation and prevent migration of the binder during curing. As shown in FIG. 2 of the drawings, the time required for gelation of a silica sol is dependent on the pH, with a minimum occurring at pH 5.5 to 6. Prevention of migration during curing is effected by adjusting the pH to a value such that gelation occurs within about 10 hours, and a pH of 4 to 7 can be used. The pH providing a minimum gelation time can be used, but for large-scale use the time allowed for mixing and application of the insulation would be unduly short. An intermediate value such as to provide a gelling time of 4 to 5 hours is preferred to allow more time for processing. A pH higher than the minimum-time pH is preferred over the lower pH providing the same gelation time since metal substrates such as mild steel are corroded by the low pH material. For "Ludox HS" a pH of 6.6 provides the best results. The pH can be adjusted by addition of a mineral acid such as sulfuric acid.

Potassium titanate is provided in the insulation composition at a proportion of 20 to 45 quarts by weight per 100 parts of the total dry components. A minimum of 20 parts is required to produce a high reflectance, and at over 45 parts per 100 shrinkage is unduly increased and strength decreased. Higher proportions of potassium titanate also result in decreased refractoriness and a lower reflectance owing to yellowing of this component upon exposure to radiant heat. The potassium titanate is employed in finely divided form, and preferably in the form of very fine, elongated fibers. Examples of suitable forms of potassium titanate in clude "Tipersul" (trade name of E. I. du Pont de Nemours, Incorporated) having the following properties: average particle diameter, 1 micron; average particle length, 100 microns; melting point, 2,500° F.; theoretical density, 3.58 grams per cubic centimeter; and chemical composition $K_2Ti_6O_{13}$ and "pigmentary" potassium titanate, available commercially from E. I. du Pont de Nemours, Incorporated, and having the following properties: average particle diameter, 0.2 micron; average particle length, 8 to 12 microns; melting point 2,300 to 2,400° F., the lower value for this material resulting from a higher salt content; theoretical density, 3.55; and chemical composition, $K_2Ti_6O_{13}$.

Fibrous asbestos is provided in the composition to reduce shrinkage and impart mechanical strength. Up to 30 parts by weight asbestos per 100 parts of the total dry components can be used, and at higher proportions reflectance is unduly decreased. About 15 to 20 parts is preferred for high strength consistent with a high reflectance. The asbestos component should be in the form of relatively long fibers, preferably averaging ¾ in in length, in order to produce a maximum strengthening effect. An example of suitable asbestos is carded, number I chrysotile AAAA grade having a maximum iron content of 1.3 weight percent, which material is available from Asbestos Corporation of America.

Refractory fibers of alumina-silica fiberglass or similar material are provided in the insulation at a proportion of 20 to 60 parts by weight per 100 parts of the total dry components. At higher proportions the mixture becomes difficult to work and reflectance is decreased. At least 20 percent is required to produce the desired recractoriness and reflectance properties consistent with mechanical strength. It is preferred to use high-alumina fibers available under the trade name "Fiberfrax" (trade name of the Carborundum Company) and having the following properties: chemical composition, $Al_2O_3 \cdot 2SiO_2$; melting point, 3,200° F.; particle diameter, submicron to 10 microns; particle length, up to ½ inch; boric oxide content, 2.0 weight percent maximum; and sodium oxide content, 1.5 weight percent maximum. This material is available in washed, bulk form and unwashed, chopped form, and either form can be used, although the washed bulk form is normally used.

An insulating composition which has been found to possess excellent overall properties includes potassium titanate, high-alumina "Fiberfrax" fibers and asbestos as the dry components at relative weight proportions of 40, 40 and 20 parts, respectively, per 100 parts total dry components and a silica sol containing 30 weight percent silica combined with the dry components at a weight proportion 420 parts silica sol per 100 parts dry component, the silica sol having been acidified to a pH of 6.6 by addition of sulfuric acid.

The insulation composition of the present invention is prepared by acidifying a silica sol to the desired pH as described above and mixing the sol with the remaining components. To insure maximum homogeneity it is preferred to mix the dry components prior to combining them with the sol. Suitable mixing can be obtained by agitation in a conventional blender for a few minutes.

The resulting mixture has a consistency such that it can be applied to a substrate by trowelling or rolling. To obtain rigidity and strength, the surface or substrate to be insulated must be provided with reinforcing means such as a metal mesh or latticework projecting outward from the surface, the insulation being forced into the crevices therein. Open-faced metal honeycomb partially crushed or crimped to provide interlocking support is preferred for this purpose. The insulation can be applied to produce a thickness up to about ½ inch (after shrinkage of approximately 26 percent during curing). Thicker layers of this material tend to crack. For most heat-shielding applications a cured insulating layer 0.25 to 0.30 inch thick will provide adequate protection. As indicated above the mixture must be applied prior to the onset of gelation for the particular mixture, as determined by the pH of the sol.

Following application to the substrate the insulation is cured by allowing it to gel fully and dry at room temperature and then subjecting it to mild heating. In a preferred procedure the insulation is covered with a sheet of moisture-impermeable material such as Saran wrap and held at room temperature until fully gelled and hardened. A period of at least 12 hours is required for this step, and longer times are employed for compositions acidified to pH other than that providing minimum gelation time. About 24 hours is preferred for silica sols acidified to pH 6.6. The protective covering prevents cracking, which would otherwise result from too rapid initial evaporation.

The fully gelled material is then uncovered and allowed to dry in air at room temperature for at least about 48 hours, the relative humidity of the air being at least 50 percent. This procedure is also designed for prevention of cracking by providing for slow removal of moisture. After air-drying the insulation is heated to a temperature of 110 to 130° and held at this temperature for at least 8 hours to effect further removal of moisture. Higher temperatures in this step will result in cracking. Finally, the insulation can be heated to a higher temperature such as 170 to 190° F. and held for about 2 hours to ensure complete removal of water. The temperature in this step is not critical as in the previous steps, and higher temperatures can be used. It is preferred to apply the heat in these steps by directing radiant heat to the uninsulated side of the substrate. Where this approach is not practical, heat can be applied directly to the insulation by means of radiant heating lamps.

The invention is further illustrated by the following example.

EXAMPLE

An insulation composition embodying the invention was prepared by mixing pigmentary potassium titanate, "Fiberfrax" alumina-silica fibers and asbestos fibers with "Ludox HS" silica sol, acidified to a pH of 6.6, each of these materials having the properties specified above as preferred, at weight proportions of 40, 40, 20 and 420, respectively. The mixture was formed into specimens approximately ⅓ inch thick for property determinations, and in some cases applied to a metal substrate having a supporting metal grid welded thereto. The specimens were cured by covering them with a moisture-impmeable sheet for 24 hours, uncovering them and air-drying at room temperature for 48 hours, heating at 110 to 130° F. for 8 hours and heating at 170 to 190° F. for 2 hours. Specimens of the previously known insulation containing 90 parts by weight of fibrous potassium titanate having 10 weight percent glass fibers added thereto, 10 parts fibrous asbestos and 420 parts Ludox HS silica sol (not acidified) were also prepared for comparison purposes. Mechanical strength was determined for specimens by means of a transverse flexure test. The results obtained are shown in the following table. The values given are averages of 15 specimens, and the numbers in parenthesis are average deviations.

TABLE I.—MECHANICAL STRENGTH OF INSULATION SPECIMENS

| Condition | Modulus of rupture, p.s.i. | |
|---|---|---|
| | Acidified-sol material | Previous material |
| Load applied face side | 1,535 (292) | 670 (101) |
| Load applied back side | 1,380 (225) | 1,172 (124) |
| Soaked in water 100 hours, load applied back side | 965 (114) | 926 (190) |
| Soaked in water 100 hours, dried load applied back side | 1,340 (144) | 1,159 (118) |
| Heated at 24 B.t.u./ft.²/sec. for 150 seconds, load applied back side | 920 (83) | 995 (120) |

It may be seen from the above that the specimens embodying the present invention showed substantially greater strength than the previous material under all conditions, except after prolonged exposure to an intense heat flux. The latter result is due to the presence of a larger proportion of asbestos, which loses strength at high temperature, and the remaining high-temperature strength is adequate for launch vehicle heat-shield uses.

Figure 3:
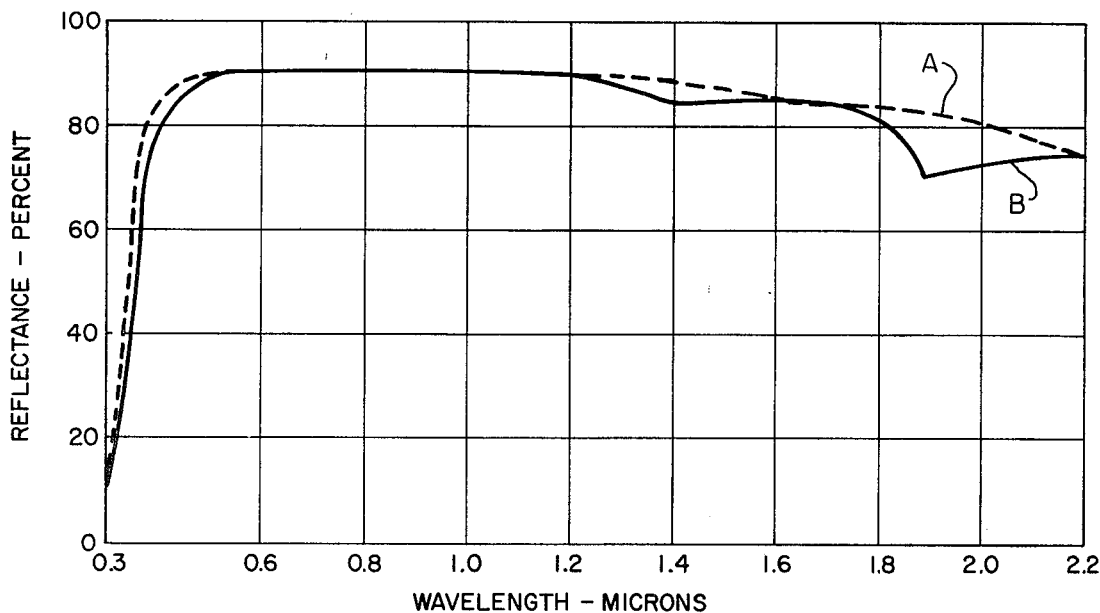
FIG. 3 is a graph showing the spectral reflectance of insulation prepared by the present invention.

Reflectances of the acidified sol and the previous material were determined by means of a Perkin-Elmer double-pass, single-beam spectrophotometer equipped with an integrating sphere to measure absolute spectral reflectance in the 0.30 to 2.2 micron wavelength range. The results obtained are shown by FIG. 3 in the drawings, curve A representing the reflectance for the acidified sol specimens and curve B the previous material. It is noted that improved reflectance is obtained at the higher wavelengths where a peak occurs in the radiant heating spectrum from rocket exhaust plumes.

Figure 4:
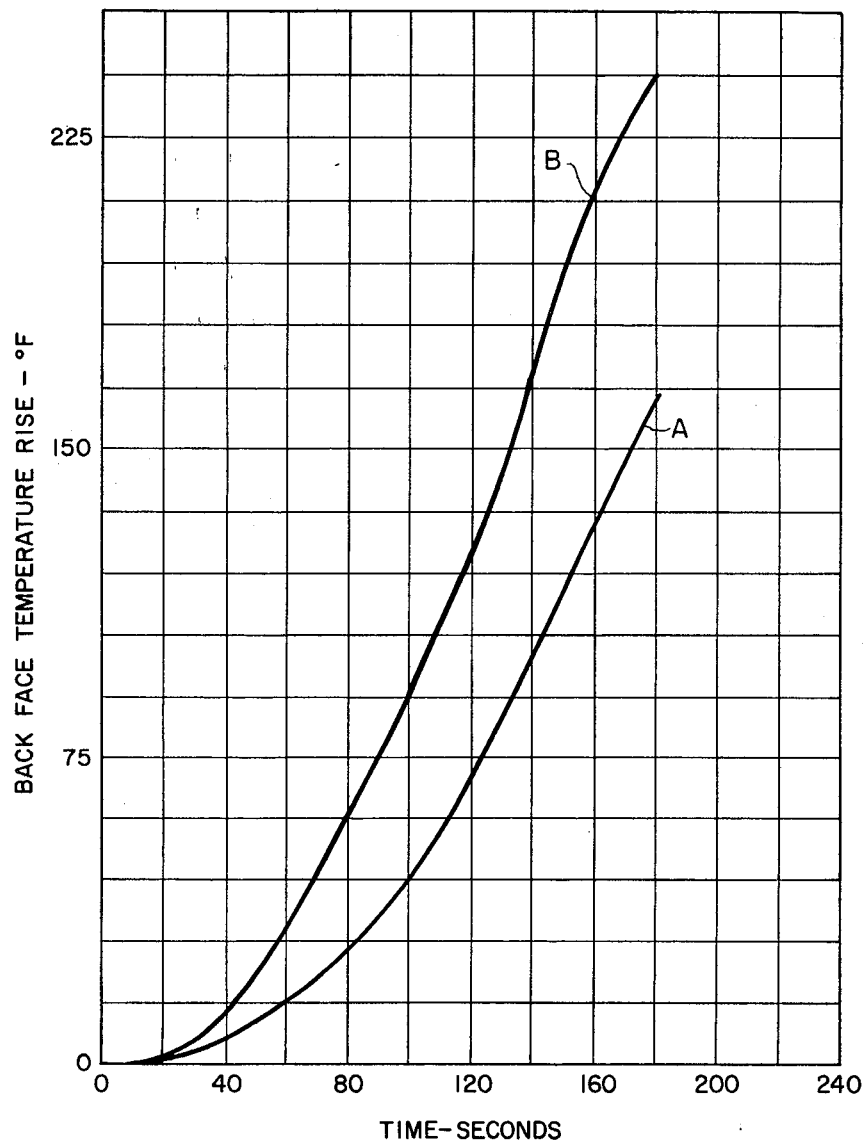
FIG. 4 is a graph showing the back-face temperature rise of the present insulation and previously known insulation upon exposure to radiant heat.

The insulating efficiencies of the two compositions in a radiant heating environment were compared by exposing specimens to a radiant heat flux of 24 B.t.u./ft.²/sec. for 180 seconds and periodically measuring the temperature on the back side of the specimens. The results obtained are shown in FIG. 4, the data for acidified sol material being shown by curve A and the previous material by curve B. Much-improved efficiency is shown for the acidified-sol material; after 160 seconds exposure it showed a backside temperature of only 140° F. as compared to 195° F. for the previous insulation.

Insulating efficiencies in a convective heating environment were then determined by exposure of specimens to convective heat from an oxygen-acetylene-air blast burner and measuring the backface temperature rise. The results can be obtained as shown by the following table.

TABLE II.—CONDUCTIVE HEAT INSULATION EFFICIENCY

| | | Back-face temperature rise | | | |
|---|---|---|---|---|---|
| | | 145 seconds | | 180 seconds | |
| | Insulation thickness | Acidified sol material | Previous material | Acidified sol material | Previous material |
| Heat flux, B.t.u./ft.²/sec.: | | | | | |
| 10 | 0.310 | 315 | 301 | 411 | 372 |
| 30 | 0.310 | 589 | 579 | 731 | 690 |
| 50 | 0.450 | 298 | 609 | 439 | 756 |
| 90 | 0.450 | 466 | 959 | 696 | 1,124 |

The acidified-sol insulation shows substantially lower increases in back-face temperature at the higher heating rates.

Other properties determined for the acidified sol material were as follows: bulk density, 61 pounds per cubic foot; water absorption, 44 percent; specific heat, 0.246 B.t.u/lb./° F. in the 77 to 212° F. temperature range and thermal conductivity, 1.34 and 1.77 B.t.u./ft.²/hr./° F./in. at 200 and 800° F., respectively.

Another composition was prepared by the procedure given above for the acidified sol material, except that the relative proportions of "Fiberfrax," potassium titanate and asbestos fibers were 50, 30 and 20 parts, respectively. This material also showed improvement over the previous insulation, but to a lesser extent than the composition containing 40, 40 and 20 parts, respectively, of these components.

The above example is merely illustrative and is not to be understood as limiting the scope of the invention, which is limited only as indicated by the appended claims.

What is claimed is:

1. An unfired ceramic insulation composition capable of being applied to the surface of an article and of forming thereon a coating resistant to radiant heating, said composition comprising a silica sol binder acidified to a pH of approximately 4 to 7, finely divided potassium titanate, fibrous asbestos and alumina-silica fiber glass.

2. The composition of claim 1 wherein the amount of said silica sol is 330 to 450 parts by weight per 100 parts of the remaining components.

3. The composition of claim 2 wherein the amount of potassium titanate is 20 to 45 parts by weight per 100 parts total dry components.

4. The compostion of claim 3 wherein the amount of asbestos fibers is 15 to 20 parts per 100 parts total dry components.

5. The composition of claim 4 wherein the amount of alumina-silica fiber glass is 20 to 60 parts by weight per 100 parts total dry components.

6. The composition of claim 5 wherein the weight proportions of potassium titanate, alumina-silica fibers, asbestos and silica sol are 40, 40, 20 and 420 parts by weight respectively.

7. An article of manufacture comprising a metal substrate having projections extending outward from the surface thereof, a layer of an unfired ceramic insulation applied to said substrate and extending into the spaces between said projections, said insulation consisting of an acidified silica sol binder having dispersed therein finely divided potassium titanate, refractory alumina-silica fibers and asbestos fibers.

8. The method of preparing an insulating coating which comprises acidifying an aqueous silica sol to a pH of 4 to 7, mixing the resulting acidified sol with finely divided potassium titanate, refractory alumina-silica fibers and asbestos fibers to produce a trowellable mixture, applying a layer of said mixture prior to gelation thereof to a substrate having reinforcing means for engaging said layer and curing the resulting layer.

9. The method of claim 8 wherein said sol is acidified to a predetermined pH value such that the elation time for said sol is 4 to 5 hours.

10. The method of claim 8 wherein said layer is cured by allowing it set while covered with a sheet of moisture-impermeable material for a period of at least 12 hours, air-drying at room temperature for at least 48 hours, and heating at a temperature of 110 to 130° F. for at least 8 hours.

11. The method of claim 10 wherein said layer is heated at a temperature of 170 to 190° F. for at least 2 hours after being heated to 110 to 130° F.

References Cited

UNITED STATES PATENTS

| | | | |
|---|---|---|---|
| 3,231,401 | 1/1966 | Price et al. | 106—69 |
| 3,253,936 | 5/1966 | Weindel | 106—69 |
| 3,296,060 | 1/1967 | Seitzinger | 161—115 |

JOHN T. GOOLKASAN, Primary Examiner

W. E. HOAG, Assistant Examiner

U.S. Cl. X.R.

117—138, 139; 161—68, 115, 193, 205, 206; 252—313